Figure 1:
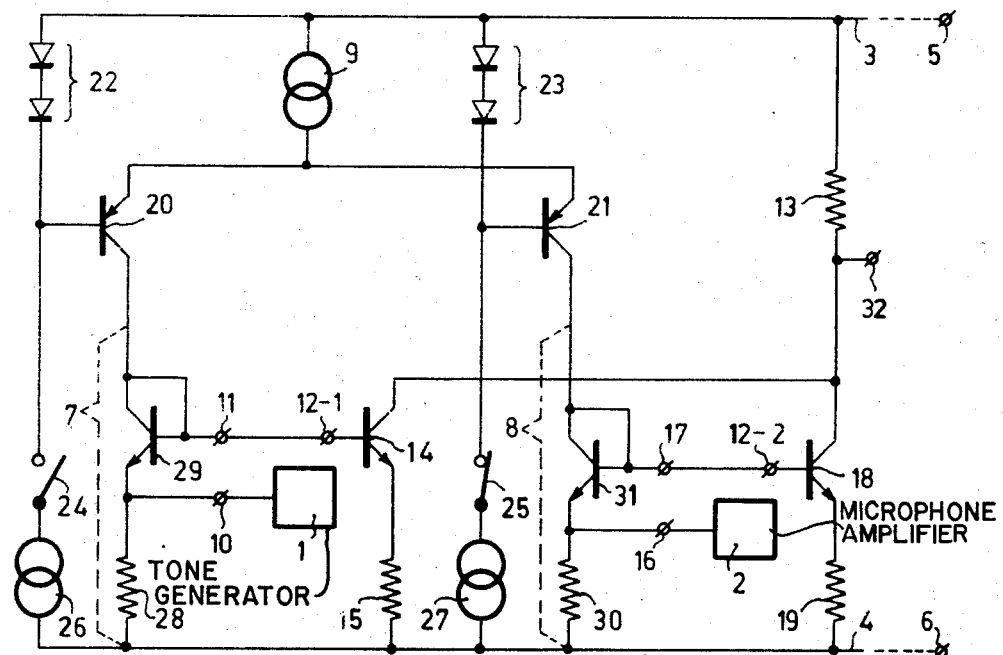

United States Patent [19]
van der Plaats

[11] 3,978,295
[45] Aug. 31, 1976

[54] CIRCUIT ARRANGEMENT FOR A TONE PUSHBUTTON SELECTION TELEPHONE SUBSCRIBER SET

[75] Inventor: Petrie Johan van der Plaats, Hilversum, Netherlands

[73] Assignee: U.S. Philips Corporation, New York, N.Y.

[22] Filed: Feb. 11, 1975

[21] Appl. No.: 548,996

[30] Foreign Application Priority Data
Feb. 26, 1974 Netherlands ................. 7402574

[52] U.S. Cl. ................. 179/84 VF; 179/81 R
[51] Int. Cl.² ................. H04M 1/50
[58] Field of Search .......... 179/84 R, 84 VF, 90 K, 179/90 R, 81 R

[56] References Cited
UNITED STATES PATENTS

| | | | |
|---|---|---|---|
| 3,424,870 | 1/1969 | Breeden | 179/84 VF |
| 3,454,726 | 7/1969 | Gasser | 179/84 VF |
| 3,588,373 | 6/1971 | Thyssens | 179/84 VF |
| 3,665,489 | 5/1972 | Vollmer | 179/90 K |

*Primary Examiner*—Kathleen H. Claffy
*Assistant Examiner*—Joseph A. Popek
*Attorney, Agent, or Firm*—Frank R. Trifari; Simon L. Cohen

[57] ABSTRACT

A circuit arrangement for a tone push-button selection telephone subscriber set, in which a tone signal generator and a microphone amplifier are coupled to direct current networks, each of which is coupled to an output network such that two current mirror circuits having the same current ratio factor are obtained. The direct currents in the networks are exclusively switched by means of a long-tailed pair, so that the direct current flowing in the output network has a constant value.

4 Claims, 3 Drawing Figures

CIRCUIT ARRANGEMENT FOR A TONE PUSHBUTTON SELECTION TELEPHONE SUBSCRIBER SET

A circuit arrangement for a tone pushbutton selection telephone subscriber set comprising two line connection terminals, a tone generator, coupled to the line connection terminals, for supplying tone signals to the connection terminals, and a microphone amplifier, coupled to the connection terminals, for supplying speech signals to the connection terminals. Circuit arrangements of this kind for tone pushbutton selection telephone subscriber sets are generally known.

One of the main reasons for using telephone subscriber sets incorporating tone pushbutton selection signalling is the fact that in a telephone exchange comprising a tone signal receiver digits can be quickly selected. However, it was found that the selection speed of a tone pushbutton selection telephone subscriber set in co-operation with the tone signal receiver arranged at the exchange is substantially lower than could be expected on the basis of the operating speed of the individual tone generator and the individual tone signal receiver. This low selection speed is due to the fact that during the selection interference signals are generated directly prior to each tone signal combination, the said interference signals making the tone signal receiver insensitive for a given period of time. These interference signals are generated due to a variation of the direct current resistance of telephone subscriber set when the speech circuit is disconnected, and the connection of the tone generator in the subscriber loop and vice versa. This switching in the direct current network of the subscriber loop causes variations in the direct current upon switching, the said variations producing voltage pulses across the alternating current impedance of the telephone subscriber set circuit. These voltage pulses actuate the input bandpass filters of the tone signal receiver at the exchange, with the result that these filters are blocked for a shorter or longer period of time in dependence of their design.

The invention has for its object to eliminate this drawback and to realize a circuit arrangement for a tone pushbutton selection telephone subscriber set by means of which an optimum speed for selecting digits in a suitably adapted telephone exchange can be realized, the said circuit arrangement being particularly suitable for integration.

The circuit arrangement according to the invention is characterized in that it comprises two networks which are coupled to the connection terminals and to a defined direct current source to make a direct current of the same value flow in each of the networks, each network being provided with an input terminal, one of the input terminals being coupled to the tone generator in order to supply tone signals thereto, the other input terminal being coupled to the microphone amplifier in order to supply speech signals thereto, the networks comprising output terminals which are each coupled to inputs of an output network arranged between the connection terminals, a switching device which is coupled to the networks being provided for supplying one of the alternating current signals present on the output terminals to the output network as desired, the level of the direct current flowing through the output network being maintained during the switching over.

The major advantage of the invention is that an optimum speed is realized for the selection of digits in a telephone exchange.

It is a further advantage that the levels of the signals of the tone generator and the microphone amplifier can both be controlled as a function of the defined loop direct current, with result that any overdriving of trunk carrier systems by the tone signals is avoided.

It is a further advantage yet that when a pushbutton is depressed, the tone generator need not start after the connection has been assigned to the tone oscillator upon switching over, but can already be previously actuated so that the selection speed is further increased.

A further advantage consists in that the circuit can be readily integrated.

It is to be noted that U.S. Pat. No. 3,064,084 describes a tone pushbutton telephone subscriber set comprising a carbon microphone and a tone generator having a mutually different direct current resistance and provided with an anti-local network with non-linear elements to reduce the effect of the mutually different values of the direct current resistances of the carbon microphone and the tone generator on the direct current resistance of the tone pushbutton telephone subscriber set. However, this effect is not eliminated and, moreover, during the switching over of the carbon microphone to the tone generator and vice versa an increase of the direct current resistance occurs, with the result that undesired interference signals are generated.

The invention will be described in detail hereinafter with reference to some embodiments as shown in the Figures, corresponding parts of the various Figures being denoted by the same references.

Figure 2:
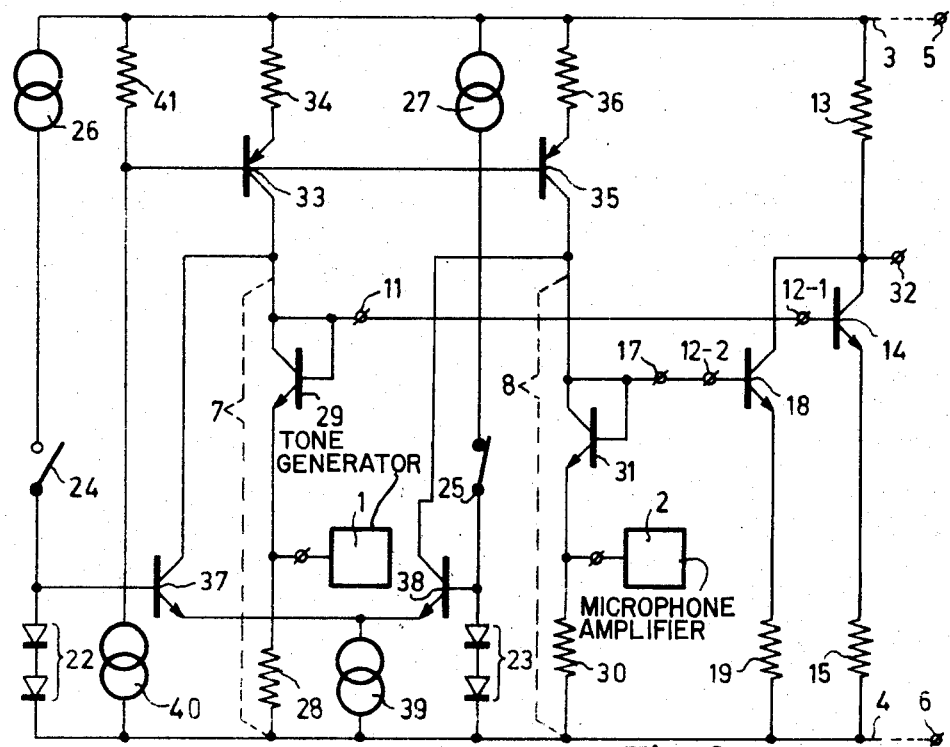
Figure 3:
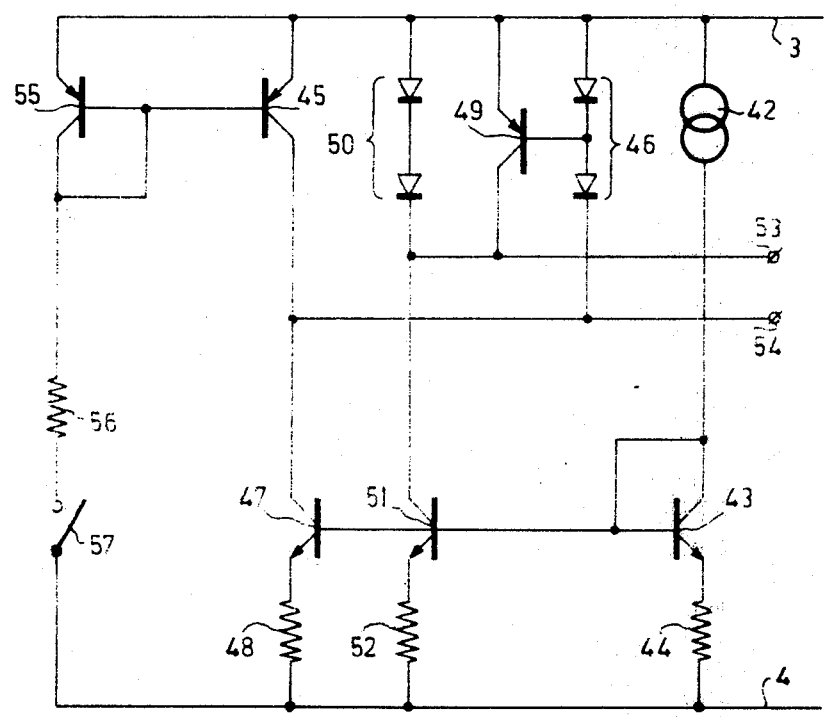

FIG. 1 shows an embodiment of a circuit arrangement for a tone pushbutton selection telephone subscriber set according to the invention, FIG. 2 shows a further embodiment of a circuit arrangement for a tone pushbutton selection telephone subscriber set according to the invention, and FIG. 3 shows an embodiment of a switching device for use in one of the embodiments shown in the FIGS. 1 and 2.

The embodiment of FIG. 1 comprises a circuit which forms part of a circuit of a tone pushbutton selection telephone subscriber set comprising a tone generator 1 and a microphone amplifier 2. A tone pushbutton telephone selection subscriber set is adapted to select digits by means of a special signalling system. This signalling system utilizes two different frequency bands which are situated within the frequency band of a speech channel, each frequency band containing four tone signals having specific signalling frequencies. For the transmission of a digit use is made of a tone signal combination which is composed of a signalling frequency situated in the one frequency band and a signalling frequency situated in the other frequency band. These two signalling frequencies per tone signal combination are generated in known manner by the tone generator 1 under the control of a pushbutton switch (not shown in the Figure), and are transmitted, via a subscriber line, to a tone signal receiver arranged at a telephone exchange. In this receiver the tone signal combination is applied in known manner, via a possibly present limiting amplifier, to input bandpass filters. These bandpass filters separate the tone signal combination into the individual signalling frequencies situated in each band, after which these frequencies are applied to detectors which are selective for the individual signalling frequencies. In order to recognize a tone signal combination from received signals, the output signals of the detectors are applied to a code selection device which determines whether exclusively one signalling frequency per band is received.

In known circuits for tone pushbutton selection telephone subscriber sets the speech circuit is first shortcircuited, directly prior to the transmission of a tone signal combination, by a common short-circuit contact provided in the pushbutton switch in order to prevent the subscriber loop from being interrupted or the transmission of speech signals, the tone oscillator subsequently being connected in the subscriber loop. As a result, the direct current in the subscriber loop varies step-wise. These direct current variations cause the appearance of voltage pulses across the alternating current impedance of the subscriber set circuit. These voltage pulses actuate the input filters of the receiver, thus producing an oscillation which overdrives the limiting amplifier. As a result, the tone pushbutton selection signals are suppressed. The voltage pulses also have steep edges, so that they contain frequencies which are situated within the bands of the bandpass filters of the tone receivers. If the limiting section of the limiting amplifiers is not sufficient, the bandpass filters are actuated, so that a plurality of detectors can simultaneously supply output signals. The above effects block the tone signal receiver for tone of milliseconds, with the result that the high selection speed of the tone pushbutton telephone subscriber set cannot be utilized.

This effect is mitigated according to the invention in that, as is shown in FIG. 1, two networks 7 and 8 which are coupled to the line connection terminals 5 and 6 via the conductors 3 and 4 are provided, the said networks being coupled to a defined current source 9. The network 7 furthermore comprises an input terminal 10 having connected thereto the tone generator 1, and an output terminal 11 having connected thereto an input 12-1 of an output network 13, 14, 15, 18 and 19 which is connected between the conductors 3 and 4. Similarly, the network 8 comprises an input terminal 16 having connected thereto the microphone amplifier 2, and an output terminal 17 which is connected to an input 12-2 of the output network 13, 14, 15, 18 and 19. There is also provided a switching device 20, 21, 22, 23, 24, 25, 26 and 27 which is coupled to the networks 7 and 8.

The network 7 comprises the series connection of a resistor 28 and a diode 29, constructed as a transistor connected as a diode, and the network 8 comprises the series connection of a resistor 30 and a diode 31 which is again constructed as a transistor connected as a diode. In FIG. 1 these networks are connected at one end to the conductor 4, there other ends being connected to collectors of the transistors 20 and 21 which form part of the switching device. The emitters of these transistors are connected to each other, and, via a current source 9, to conductor 3. It is thus achieved that the networks 7 and 8 are included in the collector circuits of a so-termed long-tailed pair circuit 20, 21 which is provided with a defined current source 9 in the emitter circuit.

In order to enable the switching over of the currents in the collector circuits of the long-tailed pair, the control electrodes of the transistors 20 and 21 are connected on the one side, via diodes 22, 23, to conductor 3, and on the other side, via the contacts 24 and 25 and the current sources 26 and 27, to the conductor 4. It is to be noted that the contacts 24 and 25 are switched in a manner yet to be described such that when contact 24 is open, contact 25 is closed and vice versa. The output network comprises a resistor 13 which is connected to conductor 3 and which constitutes the common collector load resistance of transistors 14 and 18, the emitters of which are coupled, via the resistors 15 and 19, to conductor 4, their control electrodes being connected to the input terminals 12-1 and 12-2.

The operation of the circuit is as follows. If no pushbutton is depressed, the contacts 24 and 25 are in the position shown. A current then flows from conductor 3, via the diode 23, contact 25 and current source 27, to conductor 4. As a result, the base of the transistor 21 carries a voltage such that this transistor is conducting. The current supplied by the current source 9 then flows, via the main current path of transistor 21, the diode 31 and resistor 30, to conductor 4. Due to the fact that the diode 31 is conducting, the speech signals supplied by microphone amplifier 2 to input terminal 16 are present on output terminal 17.

The network 9, 21, 31, 30 and the output network 13, 18, 19 constitute a so-termed current mirror circuit. This means that the current flowing in the network 13, 18, 19 is directly proportional to the current flowing in the network 9, 21, 31, 30. The current flowing in the latter network is composed of the direct current supplied by the current source 9 and the alternating current supplied to the resistor 30 by the microphone amplifier 2. The proportionality factor between the currents flowing in the two networks is mainly determined by the values of the resistors 19 and 30. The current flowing in the output network 13, 18, 19 causes a voltage drop across resistor 13. The output voltage is derived from terminal 32.

During the selection of a digit, contact 24 is closed and contact 25 is open. In this case transistor 20 is conducting, with the result that in the network 7 a direct current flows which renders the diode 29 conducting. The signal frequencies applied to input terminal 10 by the tone generator are then present on output terminal 11. The networks 9, 20, 29, 28 and 13, 14, 15 constitute a so-termed current mirror, the proportionality factor between the currents in the networks being mainly determined by the values of the resistors 28 and 15. The value of the resistor 28 is chosen to be equal to that of resistor 30, and the value of resistor 15 is chosen to be equal to that of the resistor 19. Since the direct current flowing in the network 7 has the same value as the direct current previously flowing in the network 8, because both currents are supplied by the same source 9 and because the said current mirrors have the same proportionality factor, the direct current flowing through resistor 13 is the same when tone signals are transmitted via output terminal 32 as well as when speech signals are transmitted.

During the switching over, the value of the direct current flowing through the resistor 13 remains unchanged, because the sum of the direct currents flowing in the two networks 7 and 8 at any instant equals the direct current supplied by the current source 9. The output network 13, 14, 15, 18, 19, in conjunction with the switching device 20 to 27 inclusive and the networks 7 and 8, constitutes a so-termed exclusive-OR circuit for speech and tone signals in which the direct current in the output network remains constant because of the defined current source 9 and the use of the long-tailed pair 20, 21.

The embodiment shown in FIG. 2 differs from that shown in FIG. 1 as follows. Each of the networks 7 and 8 is connected, via a current source formed by a resistor 34, 36 and a transistor 33, 35, between the conductors 3 and 4. In order to make the currents of both current sources equal, a series connection of a defined current source 40 and a resistor 41 is connected between the conductors 3 and 4, and the control electrodes of the transistors 33 and 35 are connected to the junction of the current source 40 and the resistor 41. The current mirror circuits 40, 41, 34, 33, 7 and 40, 41, 36, 35, 8 thus formed ensure that the direct currents flowing in the networks 7 and 8 are identical.

In order to enable exclusive switching of these direct currents in the networks 7 and 8, a long-tailed pair circuit 37, 38, comprising a current source 39 in the emitter circuit is provided, the said current source being connected to the conductor 4, the base electrodes of the transistors 37, 38 being connected to the junctions of the switches 24, 25 and the diodes 22 and 23, and the collectors of the transistors 37, 38 being connected to collectors of the transistors 33 and 35.

The operation of this circuit differs from that of the circuit shown in FIG. 1 in that under the control of the contacts 24 and 25 the current supplied by the current source 33, 34 or 35, 36 is supplied, instead of via the networks 7 or 8, via the transistor 37 or 38 via the current source 39 to conductor 4. It is thus achieved that in the positions of the contacts 24 and 25 shown the tone signals supplied by the tone generator 1 can be derived from output terminal 32, while in the positions not shown the speech signals supplied by the microphone amplifier 2 can be derived therefrom.

It is to be noted that other parts of the circuit can also be realized in a different manner.

It appears from the foregoing descriptions that during the switching over from speech signals to tone signals or vice versa, the direct current in the output network, i.e. that of the subscriber circuit, remains unchanged, so that no interference signals are generated and optimum speed of digit selection in an exchange is possible.

Moreover, when the buttons are depressed, the tone generator 1 can be directly started and there is no waiting time before the contacts 24 and 25 have been changed over, so that the tone generator 1 supplies the full tone signal voltage to output terminal 32 immediately when the contacts 24 and 25 are changed over.

Furthermore, the direct current level in the subscriber circuit is maintained, which means that the signal levels supplied by the tone oscillator 1 and the microphone amplifier 2 can be controlled by the loop direct current, with the result that greater cable distances are feasible and any overdriving by trunk carrier systems by tone signals is avoided as explained in a previous Netherlands Patent Application in the name of Applicant.

In addition, the circuits of the described embodiments are very suitable for integration, because they comprise only resistors and transistors.

The number of contacts per pushbutton of the pushbutton switch can be reduced by one by means of the circuit shown in FIG. 3. This circuit comprises a so-termed current mirror circuit which is connected between the conductors 3 and 4, a first branch thereof being formed by the series connection of the current source 42, the transistor 43 which is connected as a diode, and the resistor 44, a second branch being formed by the transistor 45, the diodes 46 connected parallel thereto, and the transistor 47 and the resistor 48 connected in series therewith, a third branch being formed by the resistor 49, the diodes 50 connected parallel thereto and the transistor 51 and the resistor 52 connected in series therewith, the control electrode of transistor 49 being connected to the junction of the diodes 46.

Because the values of the resistors 48 and 52 are equal, the currents flowing through the transistors 47 and 51 were also equal, and there absolute values are equal to the current supplied by the current source 42, multiplied by the value of resistor 44 and divided by the value of the resistor 48 or 52. The collectors of the transistors 45 and 49 have connected thereto output terminals 53 and 54 which are to be connected to the base of the transistors 20, 21 or the base of the transistors 37 and 38 shown in the FIGS. 1 and 2, respectively. It is to be noted that for the co-operation with the embodiment shown in FIG. 2, all NPN transistors shown in FIG. 3 should be replaced by PNP transistors, and that the polarity of the supply voltage should be reversed.

In order to supply the desired control signals on the terminals 53 and 54, the conductors 3 and 4 have provided therebetween the series connection of the transistor 55 which is connected as a diode, the resistor 56 and a switching contact 57, the junction of the transistor 55 and the resistor 56 being connected to the base of transistor 45.

The operation of this circuit is as follows. In the position shown of switch 57, no current flows through transistor 55, so that transistor 45 is cut off. As a result, the current flowing through transistor 47 is supplied via the diodes 46, so that the voltage on output terminal 54 is low. Because the diodes 46 carry a current, transistor 49 is conducting and the voltage on output terminal 53 is high. The closing of a switch 57 causes a current to flow from conductor 3 via diode 55, resistor 56 and the switch 57. Consequently, a base current can flow for transistor 45, with the result that this transistor becomes conducting. The output voltage of terminal 54 is then high. Consequently, the diodes 46 can no longer carry a current, so that transistor 49 is cut off. The current for transistor 51 is then derived from conductor 3 via the diodes 50, so that the voltage of output terminal 53 becomes low.

What is claimed is:

1. A circuit arrangement for a tone pushbutton selection telephone subscriber set comprising two line connection terminals, a tone generator for supplying tone signals to the connection terminals, a microphone amplifier for supplying speech signals to said connection terminals, a constant current source connected to one of said connection terminals, first and second gate networks connected in parallel and connecting a side of said constant current source remote from said one of said connection terminals to the other of said two line connection terminals, each of said gate networks comprising switching means for selectively permitting current to pass through a respective gate network in which said switching means is included, said switching means of said two gate networks being operated alternately, a circuit arrangement output terminal connected to a first of the connection terminals, first and second current control means having main current paths connected in parallel between a second of said connection terminals and said circuit arrangement output terminal, each of said current control means having a separate control terminal and providing a current through the main current path thereof proportional to a signal on said control terminal, the control terminal of each current control means being connected to a different one of said gate networks, whereby the DC current through said circuit arrangement output terminal is maintained constant, a first AC connecting means in said first gate network connecting said tone generator to said control terminal of said first current control means for providing an AC signal path between said tone generator and said first current control means in response to a flow of current through said first gate network from said constant current source, and a second AC connecting means in said second gate network connecting said microphone amplifier to said control terminal of said second current control means for providing an AC signal path between said microphone amplifier and said second current control means in response to a flow of current through said second gate network from said constant current source.

2. A circuit arrangement as recited in claim 1, wherein the sum of the direct currents flowing in said two gate networks is constant, wherein each of the current control means comprises a current mirror circuit, and wherein the proportionality ratio of the first and second current control means are equal.

3. A circuit arrangement as recited in claim 2, wherein said gate networks each comprise a separate transistor, wherein the emitter terminals of the separate transistors are connected in common to said constant current source as a long-tailed pair, and wherein the collector terminals of said separate transistors are separately connected to said control terminals of said first and said second current mirrors.

4. A circuit arrangement as recited in claim 2, wherein said first and second AC connection means each comprise a diode, and wherein each of said first and second gate circuit means further comprises a further current source, a switch, and a diode, said further constant current source and said switch and said diode being connected in series across said connection terminals, a base terminal of a transistor of said long-tailed pair being connected to a side of said switch remote from said further current source, each further current source providing equal currents.

* * * * *